May 11, 1926.
J. BRINCIL
BEARING AND METHOD OF MAKING SAME
Filed Oct. 16, 1924
1,583,913
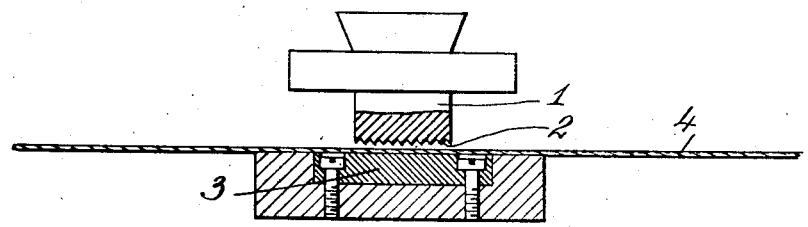
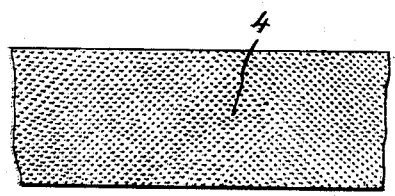
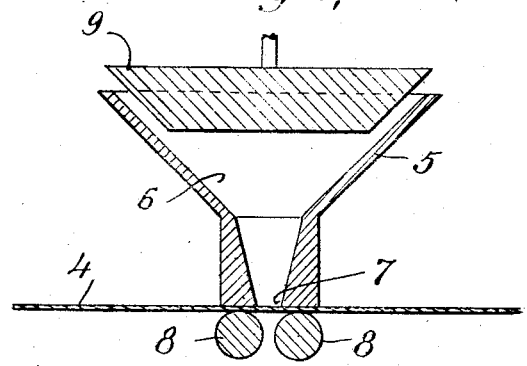
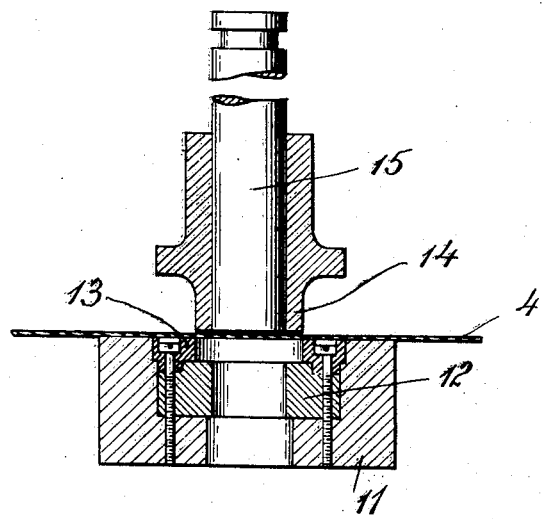
INVENTOR
Joseph Brincil
BY Pennie, Davis, Marvin & Edmonds
his ATTORNEYS Patented May 11, 1926.

1,583,913

UNITED STATES PATENT OFFICE.

JOSEPH BRINCIL, OF PLAINFIELD, NEW JERSEY.

BEARING AND METHOD OF MAKING SAME.

Application filed October 16, 1924. Serial No. 743,908.

This invention relates to self-lubricating bearings and methods of making them.

It is common practice to make self-lubricating bearings by indenting a strip of bearing metal, filling these indentations with a graphite paste, and rolling the strip into cylindrical form. Difficulty has been experienced however in retaining the graphite inserts in position during use, and furthermore the split bearing is unsatisfactory for many purposes. It is therefore an object of the present invention to provide an improved method for making such bearings with the graphite inserts held securely in place and at the same time to make the bearings of unitary non-split construction. I have attained this object by indenting a strip of bearing metal, such as bronze, filling the indentation with a lubricating paste, such as graphite and then cutting and drawing from it cylindrical cups with the lubricated face innermost and coming in contact with the punch. The cutting and punching operations force the graphite into the indentations with great pressure, which not only compresses it but actually locks it in position by overturning the upper edges of the indentations. The drawing punch also acts to burnish the metal areas of the bearing and impart to them a high polish, which is highly desirable in bearings. The grain of the metal is also compressed.

It is a further object of the invention to provide improved means for filling the indentations with the lubricant. I do this by passing the indented strip under a hopper filled with a suitable graphite mixture and having a narrow discharge opening in its bottom, the width of the strip. Suitably applied pressure within the hopper forces the lubricant into the indentations in the strip while the walls of the discharge opening wipe the face of the strip clean as it passes. The strip thus loaded with graphite is then fed to the cutting and drawing die.

In the accompanying drawings, I have illustrated diagrammatically the apparatus preferably employed in making bearings in accordance with my invention and also the condition of the bearing at various stages in the manufacturing process. In order to make the principles involved clear, I shall describe the manufacture of a bearing in connection with these drawings, in which, Figure 1 is a vertical section through a punch press used in forming the indentations in the face of the strip of bearing metal; Figure 2 is a plan view of the strip after it has passed through this press; Figure 3 is a vertical section through the lubricant hopper, showing the manner in which the paste is forced into the indentations; Figure 4 is a vertical section through a double action cutting and drawing press which shears blanks from the lubricated strip and draws them into cut form; Figure 5 is a view showing a cup removed from the drawing press before its bottom has been cut away; and Figure 6 is a section through a finished bearing.

The punch press illustrated in Figure 1 comprises a punch 1 having a knurled face 2 formed by a series of intersecting diagonal cuts, and a bottom guide 3 over which the bearing metal strip 4 passes and is supported during the punching operation. This strip is fed step by step through this punch press and by means of successive blows from the punch emerges covered with a series of punch holes or indentations as illustrated in Figure 2. The depth of these indentations is determined by the setting of the stroke of the press.

The indented strip is then passed beneath the hopper 5 illustrated in Figure 3. This hopper comprises a main body or reservoir 6 for the paste lubricant which leads into a lower discharge outlet or mouth 7 of a transverse width equal to that of the strip. Situated beneath this discharge outlet are two rollers 8 which support the strip and feed it past the outlet in close contact therewith. These rollers are made vertically adjustable to take strips of different thicknesses. The hopper is also provided with a weight or plunger 9 which bears down upon the mixture within the hopper and forces it into the indentations in the passing strip. Any excess lubricant on the face of the strip is wiped off by the far edge of the discharge outlet so that as the strip emerges the metal surrounding the indentations is clean. A number of lubricating mixtures might be employed in this process but I have obtained good results with a mixture of graphite and a binder of shellac mixed to about the consistency of mud.

The graphitized metal strip, now ready for the cutting and drawing operation, passes through the die illustrated in Figure 4. This die is designed to be used on a double action press provided with two rams working within each other and independently adjustable. The outer ram is so actuated that for a certain period of the revolution of the press shaft it will be at rest while the inner ram, known as the plunger, continues its downward motion, this movement of the plunger determining the depth of the work. Referring now to Figure 4, 11 represents a die bolster or shoe bored to fit a drawing die 12 and a cutting die 13. In order to correctly locate the two dies with reference to each other, they are provided with annular shoulders, as illustrated. Above the dies is mounted a blanking punch 14 fitted to the ram, not shown, and a drawing punch 15 fitted to the plunger, also not shown. In operation, the press operates as follows: The blanking punch and drawing punch descend simultaneously and shear the blank from the strip 4. This blank is carried down through the cutting die and clamped around its periphery between the upper face of the drawing die and the lower face of the blanking punch. When this position is reached the downward movement of the blanking punch ceases, while the drawing punch continues and draws the blank into cup form, forcing it entirely through the drawing die. The pressure exerted by the blanking punch on the periphery of the blank is sufficient to prevent wrinkling during the drawing operation but not sufficient to prevent the drawing of the blank through the drawing die to complete the cup. The cup is stripped by the sharp lower edge of the die when the punch is retracted. The drawn cup then appears as shown in Figure 5 and it only remains to trim the rough upper edge and remove to bottom to form a complete bearing as illustrated in Figure 6.

Where bearings are to be made in which the ratio of length to diameter is considerably greater than that of the bearing illustrated, it may be necessary to resort to the use of redrawing dies, but as such dies are well known in the art, it is believed unnecessary to discuss in detail their construction and operation.

In the foregoing process of cutting and drawing the graphitized metal strip to form a cup, the graphite compound is pressed into the indentations under the great pressure required to shear or punch out the metal blank and the pressure exerted by the punch in the drawing operation. This latter pressure not only compresses the graphite in the indentations, but actually turns over the top edges of the indentations or knurl by a burnishing action and securely locks the lubricant in place. The metal between the graphite inserts is at the same time given a high polish which is very desirable in a bearing. The metal is also improved during the drawing operation in that its grain is compressed.

Besides these advantages bearings made in accordance with the present invention have a continuous periphery and are therefore superior to the split type for many uses.

In addition to the foregoing advantages the drawing operation is also relatively inexpensive so that I am enabled to produce not only a superior bearing and one which will withstand wear much longer than similar bearings made by other processes, but one which can be produced at a much lower cost.

I claim:

1. The method of making self-lubricating bearings which comprises forming indentations in a strip of bearing metal, filling the indentations with a lubricating paste, and drawing the metal into cylindrical form.

2. The method of making self-lubricating bearings which comprises forming indentations in a strip of bearing metal, filling the indentations with a lubricating paste, and subjecting the lubricated face of the metal to heavy pressure to compress the lubricant and overturn the edges of the indentations to lock the lubricant in place.

3. The method of making self-lubricating bearings which comprises forming indentations in a strip of bearing metal, filling the indentations with a lubricating paste, and drawing the metal into cylindrical form in a drawing die, the lubricated face of the metal being innermost.

4. The method of making self-lubricating bearings which comprises forming indentations in a strip of bearing metal, filling the indentations with a lubricating paste, and drawing the metal into cylindrical form in a drawing die, the lubricated face of the metal being innermost to compress the lubricant and overturn the edges of the indentations to lock the lubricant in place.

5. The method of making self-lubricating bearings which comprises forming indentations in a strip of bearing metal, filling the indentations with a lubricating paste, and drawing the metal into cylindrical form in a drawing die under heavy pressure, the lubricated face of the metal innermost, to compress the lubricant, overturn the edges of the indentations to lock the lubricant in place, and burnish the inner face of the bearing.

6. The method of making self-lubricating bearings which comprises forming indentations in a strip of bearing metal, filling the indentations with lubricating paste, punching a blank from the strip, clamping the periphery of the blank, and drawing the center of the blank into a cylindrical cup with the lubricated face innermost.

7. The method of making self-lubricating bearings which comprises punching indentations in a strip of bearing metal, filling the indentations with a lubricating paste, and drawing the metal into cylindrical form in a drawing die with the lubricated face of the metal innermost.

8. The method of making self-lubricating bearings which comprises punching indentations in a strip of bearing metal in a punch press, filling the indentations with graphite, drawing the metal into cup form in a drawing die with the graphite filled face innermost and removing the bottom of the cup.

9. A self-lubricating bearing made by forming indentations in a strip of bearing metal, filling the indentations with a lubricating paste, and drawing the metal into cylindrical form.

10. A self-lubricating bearing made by forming indentations in a strip of bearing metal, filling the indentations with a lubricating paste, and drawing the metal into cylindrical form under heavy pressure in a drawing die, the lubricated face of the metal innermost.

11. A self-lubricating bearing made by punching indentations in a strip of bearing metal, filling the indentations with graphite and drawing the metal into cylindrical form in a drawing die with the lubricating face of the metal innermost to compress the graphite, overturn the edges of the indentations to lock the graphite in place and burnish the inner face of the bearing.

12. The method of making self-lubricating bearings which comprises forming indentations in a strip of bearing metal, filling the indentations with a lubricating paste, drawing the metal into cylindrical form, and redrawing to size.

In testimony whereof I affix my signature.

JOSEPH BRINCIL.